(No Model.)

J. MURDOCK, Jr.
HAND STAMP.

No. 261,025. Patented July 11, 1882.

WITNESSES:
John R. Woods.
John Sorenz.

James Murdock Jr. INVENTOR
by James W. See
ATTORNEY

UNITED STATES PATENT OFFICE.

JAMES MURDOCK, JR., OF CINCINNATI, OHIO.

HAND-STAMP.

SPECIFICATION forming part of Letters Patent No. 261,025, dated July 11, 1882.

Application filed March 24, 1882. (No model.)

*To all whom it may concern:*

Be it known that I, JAMES MURDOCK, Jr., of Cincinnati, Hamilton county, Ohio, have invented certain new and useful Improvements in Rubber Hand-Stamps, of which the following is a specification, reference being had to the accompanying drawings, in which—

Figure 1:
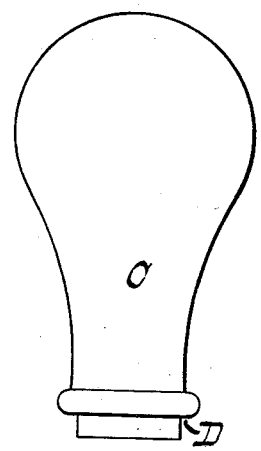
Figure 2:
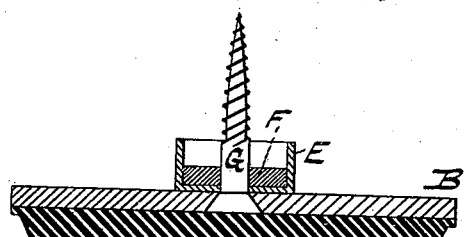
Figure 3:
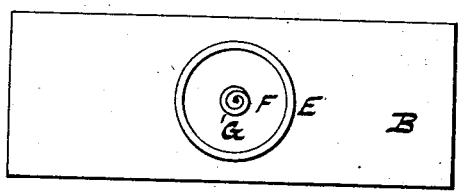

Figure 1 shows the handle; Fig. 2, the plate, die, &c., in section; and Fig. 3, the plate, &c., in plan.

This invention relates to a device for securing a neat, substantial, and cheap form of metal base for rubber stamps.

A is the rubber form or die.

B is a thin metallic plate, to which the rubber die is to be properly cemented.

C is the wooden handle, having a shoulder, D, for a ferrule.

E is a cup-shaped metal ferrule soldered to the plate B.

G is a wood-screw put through the plate and ferrule and projecting well up out of the latter. The screw is soldered into the plate B, and its slot should be filled up so as to present a plain backing-surface for the die A.

F is a disk of solder within the ferrule E, united to the ferrule and screw G. This disk of solder causes the attachment of the parts to be firm, independent of the perfection of soldering between the ferrule and plate B. The handle C screws onto the screw G, and its shoulder D contacts upon the rim of the ferrule. The handle is not depended upon as a means of uniting any of the parts, the parts being first firmly united, and the handle being subsequently placed. The inner surface of the ferrule may be threaded and the handle screwed therein, in which case the screwed projecting portion of the screw G finds a substitute and is not needed, the office of the screw G then being to unite plate B with the solder-disk F.

I claim as my invention in bases for rubber stamps—

A countersunk metallic plate, a conical-headed pin put through and soldered to said plate and having a threaded projection, a cup-shaped ferrule soldered to said plate, and a disk of solder within said ferrule united to said ferrule and to said conical-headed threaded pin, all combined substantially as set forth.

JAS. MURDOCK, JR.

Witnesses:
 J. W. SEE,
 F. WILLIAMS.